April 20, 1943.  R. C. ALLEN  2,317,092

WELDED SPINDLE CONSTRUCTION

Filed Aug. 2, 1941

Inventor
R. C. Allen
by K. A. Wyman
Attorney

Patented Apr. 20, 1943

2,317,092

UNITED STATES PATENT OFFICE 2,317,092

WELDED SPINDLE CONSTRUCTION

Robert C. Allen, Wauwatosa, Wis., assignor to Allis-Chalmers Manufacturing Company, Milwaukee, Wis., a corporation of Delaware Application August 2, 1941, Serial No. 405,137

9 Claims. (Cl. 253—39)

This invention relates generally to turbines and more particularly to a builtup rotor or spindle construction for elastic fluid turbines.

The primary object of this invention is to provide an improved turbine rotor construction of builtup form which will eliminate many of the difficulties formerly experienced in connection with the construction and operation of turbines embodying rotors of this type.

In accordance with this invention, a plurality of rotor forming members, which are usually in the nature of circular or annular disks, are correctly positioned and welded together in a novel manner providing an inexpensive structure which is much stronger than that heretofore obtained with the previously known types of construction.

The invention accordingly consists of the various features of construction, combinations of elements and arrangements of parts as more fully pointed out in the appended claims and in the detailed description, in which:

Figure 1:
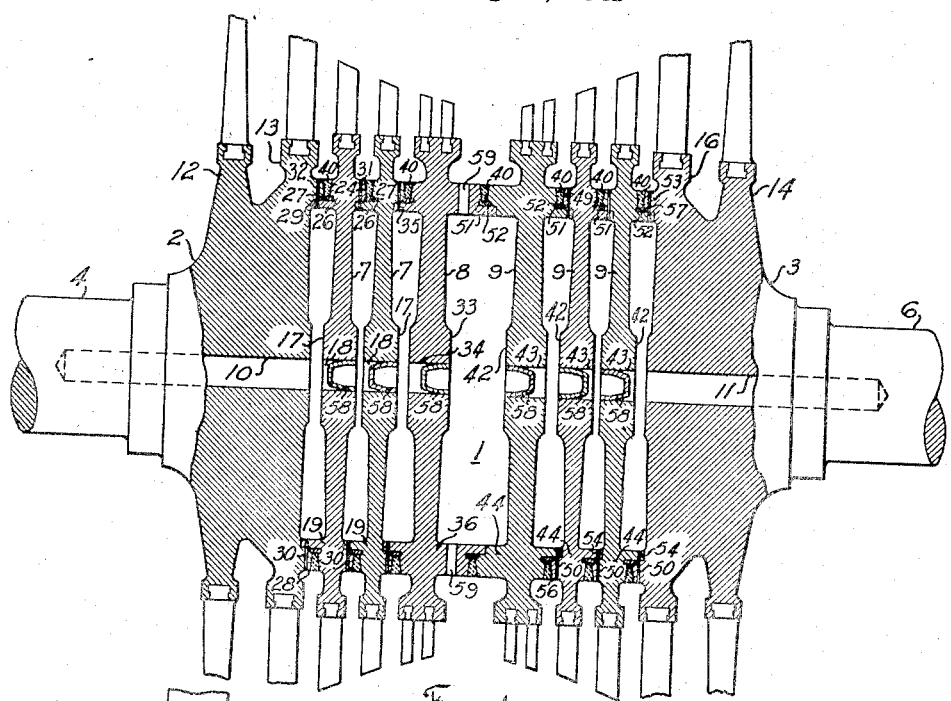
Fig. 1 illustrates a portion of a turbine rotor constructed in accordance with this invention.

Referring to the drawing, and particularly Fig. 1, it is seen that the double flow turbine spindle or rotor 1 comprises similar end members 2 and 3 provided with coaxially extending shaft portions 4 and 6 and a plurality of intermediate blade carrying disk members 7, 8 and 9. The end members 2 and 3 are provided with axial bores 10 and 11, respectively, and with axially spaced blade carrying disk portions 12, 13 and 14, 16, respectively.

Figures 2, 3:
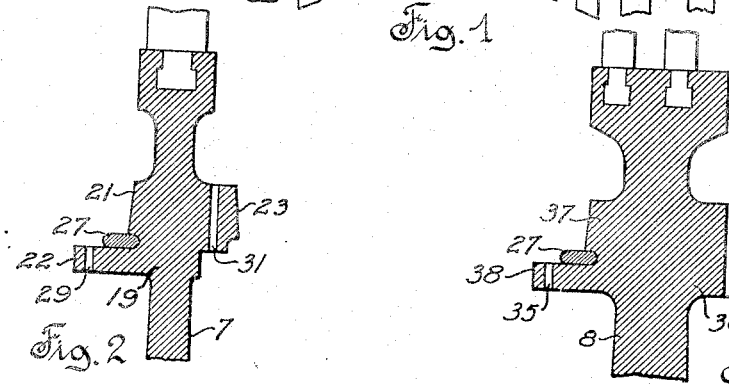
Fig. 2 is an enlarged partial sectional view of one form of rotor disk shown in Fig. 1.
Fig. 3 is an enlarged partial sectional view of another form of rotor disk shown in Fig. 1.
Figures 4, 5:
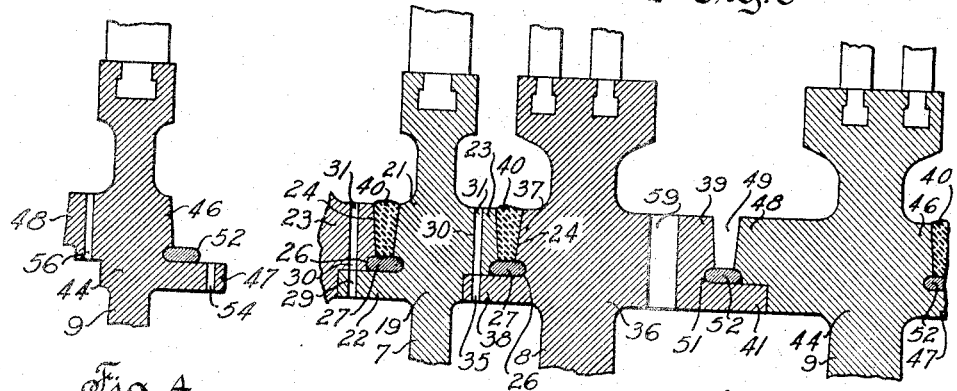
Fig. 4 is an enlarged partial sectional view of still another form of rotor disk shown in Fig. 1.
Fig. 5 illustrates the disks shown in Figs. 2, 3 and 4 in assembled relation.

The disk members 7, of which two are shown, each have an axially thickened center portion 17 provided with an opening 18 extending axially therethrough and an axially thickened concentric outer portion 19. The portion 19, as best shown in Fig. 2, presents on one side thereof two spaced concentric laterally extending projections 21 and 22 and on its opposite side a stepped projection 23. The projection 22, which is of greater axial width than the projection 21, is adapted to abut a stepped portion of the projection 23 on the next adjacent disk member and thereby position adjacent disk members in coaxial relation with the remainder of the stepped portion of the projection 23 extending in overlying spaced relation with respect to a portion of the upper surface of the projection 22 and with the side surface of the projection 23 disposed in spaced opposed relation with respect to the side surface of the projection 21, as is best shown in Figs. 1 and 5. The projections 21 and 22 on one disk member thus coact with the projection 23 on the next adjacent disk member to form therewith a peripheral groove 24 which is concentric with respect to the axis of the disks and which has a laterally enlarged inner portion 26 giving the groove a cross-sectional configuration of approximate inverted T-shape. The enlarged inner portion 26 of the groove 24 is adapted to receive a chill ring 27 and in assembling a structure of this type, the chill ring 27 is first placed between the projections 21 and 22 in the manner shown in Fig. 2, and then the disks are brought into the relationship shown in Fig. 5 thereby providing a groove for the weld metal which is defined by the opposed side surfaces of the projections 21 and 23 and the exposed outer surface of the chill ring 27. The disk portion 13 of the end member 2 is provided with a projection 28 which is identical to the projection 23 on the disk members 7 and the projections 21 and 22 on the adjacent disk member 7 coact with the projection 28 in exactly the same manner and for the purpose set forth in connection with the description of the disk members 7. The projections 22, 23 and 28 are provided with passages 29, 31 and 32, respectively, which are alined, when the end disk members are correctly assembled, to provide vent passages 30 placing the interior of the hollow spindle in communication with the spaces between the rows of blades mounted thereon as is clearly shown in Fig. 1.

The disk member 8 is also provided with a thickened center portion 33 having an opening 34 extending axially therethrough and having an axially thickened concentric outer portion 36. The outer portion 36, as best shown in Fig. 3, presents on opposite sides thereof two spaced concentric laterally extending projections 37, 38 and 39, 41. The spaced projections 37 and 38 are identical in shape and arrangement to the projections 21 and 22 on the disk members 7 and are adapted to engage the stepped projection 23 on the adjacent disk member 7 in exactly the same manner and for the purpose specifically set forth in the description of the disks 7. The projection 38 is provided with a passage 35 adapted for alinement with the passage 31 in the projection 23 on the next adjacent disk member 7.

The disk members 9, of which three are shown, each has an axially thickened center portion 42 provided with an axially extending opening 43 and an axially thickened concentric outer portion 44. The portion 44, as best shown in Fig. 4, presents on one side thereof two spaced concentric laterally extending projections 46 and 47 and on its opposite side a stepped projection 48. The projection 47, which is of greater axial width than the projection 46, is adapted to abut a stepped portion of the projection 48 on the next adjacent disk member and thereby position adjacent disk members in coaxial relation with the remainder of the stepped portion of the projection 48 extending in overlying spaced relation with respect to a portion of the upper surface of the projection 48 and with the side surface of the projection 48 disposed in spaced opposed relation with respect to the side surface of the projection 46. The projections 46 and 47 on one disk member thus coact with the projection 48 on the next adjacent disk member to form therewith a peripheral groove 49 which is concentric with respect to the axes of the disks and which has a laterally enlarged inner portion 51 giving the groove a cross-sectional configuration of approximate inverted T-shape. The enlarged inner portion 51 of the groove 49 is adapted to receive a chill ring 52 and the assemblage of these disks is carried out in exactly the same manner and for the same purpose as set forth with respect to the disk members 7. The disk portion 16 of the end member 3 is provided with a projection 53 which is identical to the projection 48 on the disk member 9 and the projections 46 and 47 on the adjacent disk member 9 coact with the projection 53 in exactly the same manner and for the purpose set forth in connection with the description of the disk members 9. The projections 47, 48 and 53 are provided with passages 54, 56 and 57, respectively, which are alined, when the end and disk members are correctly assembled, to provide vent passages 50 placing the interior of the hollow spindle in communication with the spaces between the rows of moving blades as is clearly shown in Fig. 1. The spaced projections 39 and 41 on the disk member 8 are identical in shape and arrangement to the projections 46 and 47 on the disk members 9 and are adapted to engage the stepped projection 48 on the adjacent disk member 9 in exactly the same manner as specifically set forth in the description of the disks 9.

The illustrated rotor structure is assembled by placing a chill ring 27 on the disk member 7 in the manner shown in Fig. 2, then placing the disk member 7 on the end member 2 (the projections 21 and 22 coact with projection 28 to position and maintain the disk 7 in coaxial alinement with the end member 2), then filling the remaining portion of the peripheral groove which is defined by the exposed outer surface of the chill ring 27 and the spaced opposed side surfaces on the projections 21 and 28 with weld metal 40, inserting a radium capsule or the like through the opening 18 in the disk member 7 and holding it in the space between the end member 2 and the disk member 7, then radiographing the weld, and if the weld is found to be satisfactory, removing the radium capsule and then inserting and securing in the opening 18, in any suitable manner such as by welding, a seal member 58. If more than one disk member 7 is to be employed, the additional members are provided with chill rings and assembled and welded in place one at a time in the manner just outlined. The assemblage of this one end portion of the rotor is then completed by the addition of the disk member 8 which is positioned and secured in place on the last disk member 7 in exactly the same manner the first disk member 7 is positioned and secured on the end member 2. The other end portion of the rotor is then completed by assembling the end member 3 and disk members 9 in exactly the same manner as set forth with respect to the end member 2 and disk members 7, and when this has been accomplished, the spindle is completed by placing the previously assembled end portions of the spindle in abutting relation as indicated in Fig. 5 and filling the peripheral groove defined by the exposed outer surface of the chill ring 51 and the spaced opposed side surfaces on the projections 39 and 48 with weld metal 40. This weld is then radiographed by inserting a radium capsule or the like through the relatively large vent passage 59 formed in the disk member 8. The completed rotor is then heat treated to obtain the desired or requisite physical properties and to eliminate any stress concentration which may have resulted from the welding operations.

The central openings 18, 34 and 43 in the disk members 7, 8 and 9, respectively, permit the circumferential welds uniting the disks to be readily radiographed and the insertion of the seal members 58 in the openings 18, 34 and 43 as shown in Fig. 1 prevents the steam or other motive fluid from by-passing the moving blades by entering the spaces between adjacent disk members and then flowing through the axially alined central openings provided therein. The admission of motive fluid into the spaces provided between adjacent disk members (not the by-passing of the motive fluid therethrough as above pointed out) and into the axial bores 10 and 11 provided in the shaft portions 4 and 6, respectively, is highly desirable in that it effects a rapid and uniform heating and cooling of the spindle whenever operation of the turbine is initiated and terminated, respectively, and in that it acts to maintain a more uniform spindle temperature during periods of operation. The chill rings 27 and 52, each of which has a substantially smooth cylindrical outer surface, are of materially greater axial width than the distance the proximate portions of the side surfaces presented by the pairs of opposed projections 21 and 28, 37 and 23, and 39 and 48 are spaced apart as is clearly shown in Fig. 5. The weld metal 40 unites the opposed side surfaces of said pairs of projections with the exposed portion of the outer cylindrical surface of the associated chill ring and therefore the cracks existing between the cylindrical outer surface of each chill ring and the abutting cylindrical surface portions of the said pairs of projections extend substantially parallel to the longitudinal axis of the spindle. Stated differently, each pair of projections includes axially spaced coaxial cylindrical surfaces disposed in abutting relation with axially spaced portions of the outer coaxial cylindrical surface of the associated chill ring.

In this connection, it is now established that the cracks incipient or otherwise which tend to cause a structure to fail are those which extend either at right angles or transversely with respect to the principal stress therein; that the principal stress in the welded joints uniting rotor disks or the like always acts in a direction parallel to the longitudinal axis of the rotor; and that the local stresses tending to produce or enlarge the incipient cracks at the niche or corner formed by the junction of two surfaces (such a niche or corner constituting in effect an incipient crack) always act in a manner causing the crack to extend or enlarge in the general direction of a line bisecting the angle included between said surfaces. Consequently, in order to provide a durable welded rotor, the disk elements thereof must be united by a construction which eliminates the formation or enlargement of incipient cracks in a direction transversely with respect to the direction of the principal stress therein. This result is accomplished in the hereinbefore described construction, as it is readily seen, particular attention being directed to Fig. 5, that if cracks are produced at the niche or corner formed by the junction of the upper surface of the chill ring and the side wall of the groove, the cracks if enlarged will extend in a direction substantially parallel with respect to that of the principal stress, thereby avoiding the weakened construction which would result if said cracks were to extend radially and transversely with respect to the longitudinal axis of the rotor and the principal stress, respectively. The added function and utility afforded by the chill ring and groove construction herein shown and described is to so locate the incipient cracks that the direction in which such a crack or cracks will naturally progress is substantially parallel to the longitudinal axis of the spindle thereby rendering the presence and enlargement of incipient cracks (the cracks existing between the outer surface of the chill ring and the abutting surface portions of the associated pair of projections are in effect incipient cracks) ineffective to weaken the bond of weld metal uniting the spaced opposed surface portions of the pair of groove forming projections. In other words, the location of the incipient cracks, i. e., the cracks existing between the outer surface of the chill ring and the abutting surface portions of the associated pairs of projections, is such that the stress potential (the local stresses) tending to produce a radial crack in the bond of weld metal is either a minimum or materially less than the stress potential tending to produce an axially extending crack therein and as a result if the bond of weld metal does crack, the crack will extend in a direction approximately parallel to the axis of the spindle and will not weaken the bond of weld metal uniting the spaced opposed surface portions of the pairs of groove forming projections.

This feature is of particular importance and a builtup welded spindle construction embodying this feature in combination with means for correctly positioning and maintaining the spindle forming disk members in their proper cooperative relationship during the welding operation materially reduces construction costs without in any manner reducing the stress resistant properties of the resulting structure. In fact, the stress resistant properties of a builtup welded spindle structure embodying the above mentioned combination of features are far superior to the builtup welded spindle structures embodying the positioning means heretofore employed in constructions of this type. The invention is of general application with respect to the construction of builtup welded turbine spindles and although the invention is illustrated and described as applied to a double flow type of turbine spindle, it should be understood that it is not desired to limit the invention to the exact details of construction herein shown and described as various modifications within the scope of the appended claims may occur to persons skilled in the art.

It is claimed and desired to secure by Letters Patent:

1. A builtup turbine rotor comprising two rotor forming members, said members having opposed portions provided with laterally extending projections concentrically disposed with respect to the axis of the rotor, said projections presenting opposed irregular surfaces including abutting positioning surfaces and axially spaced side surfaces surrounding and forming with an exposed portion of one of said positioning surfaces a circumferentially extending concentric groove having a laterally enlarged inner portion, a chill ring disposed in and substantially filling the laterally enlarged inner portion of said groove, and weld metal deposited in and substantially filling the remaining outer portion of said groove.

2. A builtup turbine rotor comprising two rotor forming members having opposed side portions concentrically disposed with respect to the axis of the rotor, said side portions presenting opposed irregular surfaces including abutting positioning surfaces and axially spaced side surfaces surrounding and forming with an exposed portion of one of said positioning surfaces a peripheral groove concentric with respect to the axis of the rotor, said groove including a laterally enlarged inner portion formed by said axially spaced side surfaces having circumferential portions extending in spaced overlying relation with respect to a part of said one positioning surface, a chill ring disposed in and substantially filling the enlarged inner portion of said groove, and weld metal substantially filling the remaining outer portion of said groove.

3. A builtup turbine rotor comprising two rotor forming members having opposed side portions concentrically disposed with respect to the axis of the rotor and presenting opposed irregular surfaces including abutting positioning surfaces and axially spaced side surfaces defining a peripheral groove concentric with respect to the axis of the rotor, said groove having a laterally enlarged inner portion formed by said axially spaced side surfaces having circumferential portions extending in spaced overlying relation with respect to a part of one of said positioning surfaces, a chill ring disposed in and substantially filling the enlarged inner portion of said groove, and weld metal substantially filling the remaining outer portion of said groove.

4. A builtup turbine rotor comprising two rotor forming disk members, said disk members having side portions adjacent their peripheries provided with laterally extending projections concentrically disposed with respect to the axis of the rotor, said projections presenting irregular surfaces including abutting positioning surfaces and axially spaced side surfaces defining with an exposed portion of one of said positioning surfaces a circumferentially extending concentric groove having a cross-sectional configuration of approximate inverted T-shape, a chill ring disposed in and substantially filling the laterally enlarged inner portion of said groove, and weld metal deposited in and substantially filling the remaining outer portion of said groove.

5. A builtup turbine rotor comprising two rotor forming disk members each having a central opening extending therethrough, said disk members also having side portions adjacent their peripheries provided with laterally extending opposed projections concentrically disposed with respect to the axis of the rotor and presenting positioning surfaces comprising portions of the projection on one disk member abutting and concentrically engaging portions of the projection on the other disk member, said projections also presenting axially spaced side surfaces defining therebetween a circumferentially extending concentric groove having a laterally enlarged inner portion formed by portions of said side surfaces and an exposed portion of one of said positioning surfaces, a chill ring disposed in and substantially filling the enlarged inner portion of said groove, weld metal deposited in and substantially filling the remaining outer portion of said groove, and a seal member closing said central openings.

6. A builtup turbine rotor comprising a first rotor forming member having concentrically disposed on one side thereof a laterally extending projection, a chill ring disposed on and covering a substantial portion of the outer surface of said projection, a second rotor forming member having concentrically disposed on one side thereof a laterally extending projection engaging the exposed outer surface of the projection on said first disk member and a portion of the upper surface of said chill ring and forming with said first disk member and chill ring a peripheral groove concentric with respect to the axis of the rotor, and weld metal deposited in and substantially filling said groove and thereby uniting said first disk member, said projection on the second disk member, and said chill ring.

7. A builtup turbine rotor comprising a first rotor forming disk member having on one side thereof spaced inner and outer laterally extending projections concentrically disposed with respect to each other and with respect to the axis of the disk, said inner projection being of substantially greater axial width than said outer projection, a chill ring of greater axial width than said outer projection and of less axial width than said inner projection disposed between said inner and outer projections, a second rotor forming disk member having concentrically disposed on one side thereof a laterally extending stepped projection engaging the exposed outer surface of said inner projection and a portion of the exposed outer surface of said chill ring and forming with said outer projection and chill ring a peripheral groove concentric with respect to the axis of the rotor, and weld metal substantially filling said groove.

8. A builtup turbine rotor comprising a first rotor forming disk member having on one side thereof spaced inner and outer axially extending projections concentrically disposed with respect to each other and with respect to the axis of the disk with the inner projection extending a substantial distance beyond the outer projection in the axial direction, a chill ring of greater axial width than said outer projection and of less axial width than said inner projection disposed between said inner and outer projections, a second rotor forming disk member having concentrically disposed on one side thereof an axially extending stepped projection engaging the exposed outer surface of said inner projection and a portion of the exposed outer surface of said chill ring and forming with said outer projection and chill ring a peripheral groove concentric with respect to the axis of the rotor, and weld substantially filling said groove.

9. A builtup turbine rotor comprising a first rotor forming disk member having on one side thereof spaced inner and outer axially extending projections concentrically disposed with respect to each other and with respect to the axis of the disk with the inner projection extending beyond the outer projection a substantial distance in the axial direction, a second rotor forming disk member having on one side thereof a stepped projection defined by contiguous surfaces concentrically disposed with respect to the axis of the disk and including a first surface abutting the side surface of said inner projection, a second surface engaging the portion of the exposed outer surface of the said inner projection adjacent said side surface, a third surface extending in overlying spaced opposed relation with respect to the portion of the exposed outer surface of the said inner projection adjoining said adjacent portion, and a fourth surface disposed in spaced opposed relation with respect to the side surface of said outer projection, said spaced inner and outer projections and said third surface coacting to define a peripheral groove which is concentric with respect to the axis of the rotor and which is of greater axial width than the distance between said outer projection and said fourth surface, a chill ring disposed in and substantially filling the inner portion of said groove, and weld metal disposed in and substantially filling the outer portion of said groove thereby uniting said outer projection, said fourth surface and the exposed portion of the outer surface of said chill ring.

ROBERT C. ALLEN.